(12) United States Patent
Tinnin et al.

(10) Patent No.: US 8,931,363 B2
(45) Date of Patent: Jan. 13, 2015

(54) ADJUSTABLE STEERING COLUMN

(75) Inventors: Melvin L. Tinnin, Clio, MI (US);
Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 281 days.

(21) Appl. No.: 13/299,450

(22) Filed: Nov. 18, 2011

(65) Prior Publication Data

US 2012/0304796 A1 Dec. 6, 2012

Related U.S. Application Data

(60) Provisional application No. 61/493,097, filed on Jun. 3, 2011.

(51) Int. Cl.
*B62D 1/19* (2006.01)
*B62D 1/184* (2006.01)

(52) U.S. Cl.
CPC ...................................... *B62D 1/184* (2013.01)
USPC ........................................... 74/493; 280/277

(58) Field of Classification Search
CPC ....................................................... B62D 1/184
USPC ...................... 74/492–498; 280/775, 776, 779
See application file for complete search history.

(56) References Cited

U.S. PATENT DOCUMENTS

| | | | |
|---|---|---|---|
| 4,541,298 A | 9/1985 | Strutt | |
| 4,658,664 A | 4/1987 | Jacobs et al. | |
| 5,394,767 A | 3/1995 | Hoblingre et al. | |
| 5,606,891 A | 3/1997 | Tisell et al. | |
| 5,722,299 A * | 3/1998 | Yamamoto et al. | 74/493 |
| 6,139,057 A | 10/2000 | Olgren et al. | |
| 6,460,427 B1 | 10/2002 | Hedderly | |
| 6,679,508 B2 * | 1/2004 | Smith et al. | 280/90 |
| 6,766,712 B2 * | 7/2004 | Koellisch et al. | 74/493 |
| 6,952,979 B2 * | 10/2005 | Cartwright et al. | 74/493 |
| 7,331,608 B2 * | 2/2008 | Armstrong et al. | 280/775 |
| 7,533,594 B2 * | 5/2009 | Menjak et al. | 74/493 |
| 7,685,903 B2 * | 3/2010 | Streng et al. | 74/493 |
| 7,827,880 B2 * | 11/2010 | Riefe et al. | 74/493 |
| 8,201,475 B2 * | 6/2012 | Rouleau et al. | 74/495 |
| 8,327,733 B2 * | 12/2012 | Ozsoylu et al. | 74/493 |
| 2009/0114055 A1 * | 5/2009 | Stroud | 74/493 |
| 2009/0241721 A1 * | 10/2009 | Inoue et al. | 74/493 |
| 2010/0288068 A1 * | 11/2010 | Klukowski | 74/492 |
| 2010/0300236 A1 | 12/2010 | Goulay et al. | |
| 2010/0301593 A1 * | 12/2010 | Sakata | 280/775 |
| 2011/0185839 A1 * | 8/2011 | Inoue | 74/493 |
| 2013/0174685 A1 * | 7/2013 | Yamamoto, Kou | 74/493 |

* cited by examiner

*Primary Examiner* — Troy Chambers
*Assistant Examiner* — Zakaria Elahmadi
(74) *Attorney, Agent, or Firm* — Cantor Colburn LLP

(57) ABSTRACT

A steering column is configured for positional adjustments in first and second directions and comprises a position lock for selectively resisting movement of the steering column. The position lock comprises a stationary bracket disposed about the steering column. A control shaft is coupled to the steering column, approximately perpendicular to the first and second directions, so as to couple movement of the steering column with translation of the control shaft. Movable lock plates are arranged on the control shaft for rotation about a central axis of the control shaft and for translation with the control shaft. Each of the movable lock-plates is positioned adjacent at least one stationary lock-plate that is retained in a substantially fixed position with respect to the stationary bracket. The one or more stationary lock-plates are configured so as to selectively provide resistance to relative movement of the one or more movable lock-plates.

20 Claims, 5 Drawing Sheets

ADJUSTABLE STEERING COLUMN

CROSS-REFERENCE TO RELATED APPLICATIONS

This application claims priority to U.S. Provisional Patent Application No. 61/493,097 filed on Jun. 3, 2011, the entire contents of which are hereby incorporated by reference herein.

BACKGROUND OF THE INVENTION

The present invention relates generally to locking, adjustment mechanisms for steering columns and, more specifically, to systems and methods for fixing a position of a steering column assembly while facilitating adjustments in both telescoping and raking directions.

Traditional steering column locks employ one or more friction locks arranged along the raking and telescoping ranges of motion of the steering column. Such locks can be cumbersome and bulky. They can also be susceptible to dimensional variations experienced in production, resulting in potential quality and reliability issues.

Accordingly, it is desirable to have a system and method for selectively fixing and adjusting a position of a steering column with improved reliability and compactness.

SUMMARY OF THE INVENTION

In a first aspect, an adjustable steering column is configured for positional adjustments in first and second directions and comprises a position lock for selectively resisting movement of the steering column. The position lock comprises a stationary bracket fixed to a vehicle and disposed about the steering column. A control shaft is coupled to the steering column, approximately perpendicular to the first and second directions, so as to couple movement of the steering column with translation of the control shaft. One or more movable lock plates are arranged on the control shaft for rotation about a central axis of the control shaft and for translation with the control shaft. Each of the movable lock-plates is positioned adjacent at least one stationary lock-plate that is retained in a substantially fixed position with respect to the stationary bracket. The one or more stationary lock-plates are configured so as to selectively provide resistance to relative movement of the one or more movable lock-plates.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
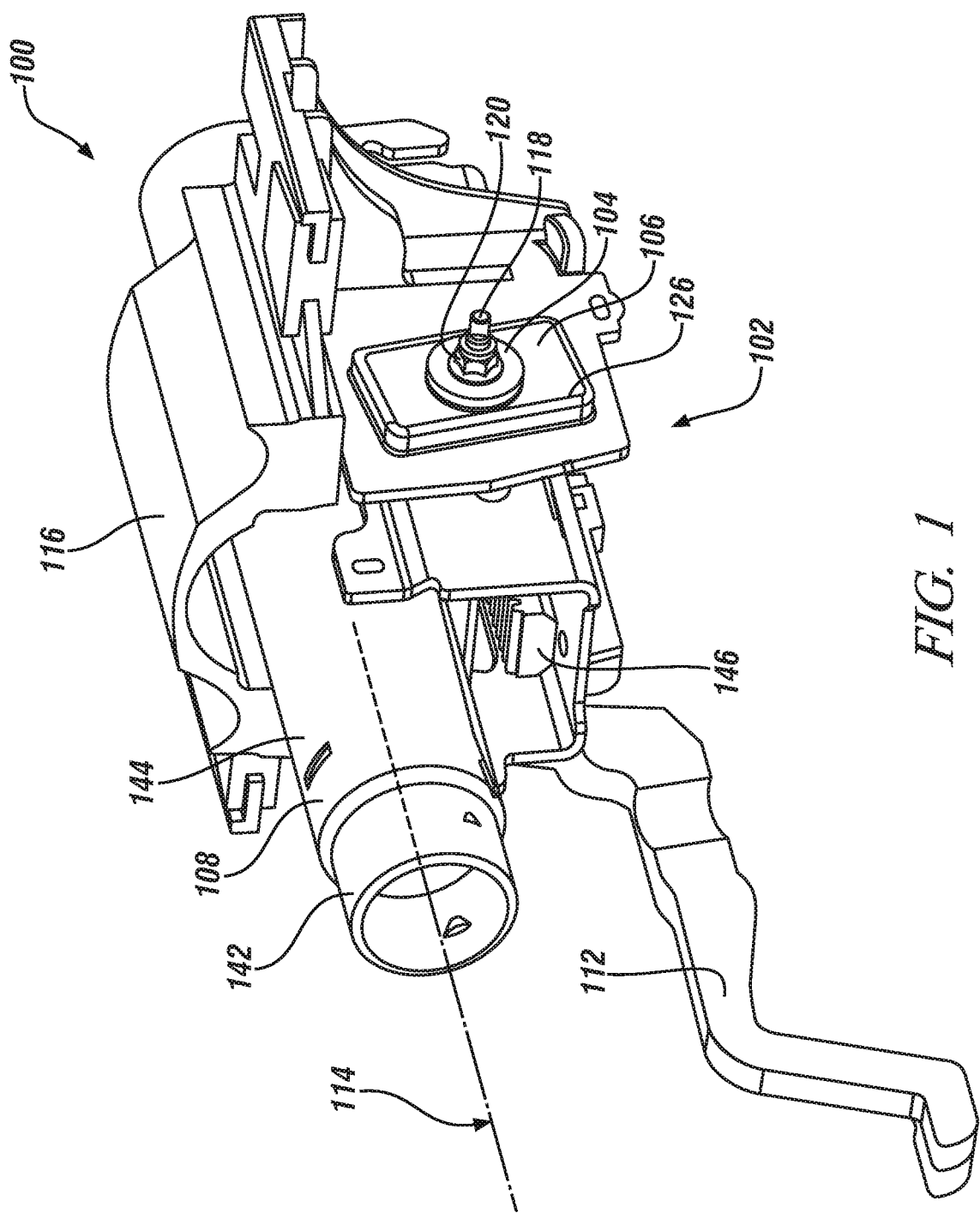
FIG. 1 is a drawing showing a perspective view of an exemplary adjustable steering column.

Referring now to the Figures, where the invention will be described with reference to specific embodiments, without limiting same, FIG. 1 shows a perspective view of an exemplary adjustable steering column assembly 100 in which a position lock 102 provides for an infinitely (i.e., continuously) variable raking and telescoping range of positions. In general, the position lock 102 includes one or more movable lock-plates 104 and one or more stationary lock-plates 106 that move relative to one another as the steering column 108 is adjusted. Frictional forces between the relatively moving plates 104, 106 are controlled by adjusting the compressive forces between adjacent plates. To lock the steering column 108 in a particular position, the compressive load forcing adjacent plates against one another is increased. To permit adjustment of the steering column 108, the compressive forces are decreased. Increasing or decreasing the compressive loads may be accomplished by modulation of a cam 110 that may be actuated by a control arm 112. The control arm 112 and/or the cam 110 may also be biased toward a position of cam 110 associated with the application of high compressive loads upon the plates so as to tend toward locking the position of the steering column 108.

In one exemplary embodiment, a locking adjustment function is provided in a first direction by coupling the motion of the steering column 108 in that first direction to the forced rotation of the movable lock-plates 104. The movable lock-plates 104 are positioned for frictional contact with the stationary lock-plates 106, and the stationary lock-plates 106 are configured and positioned so as to resist that relative motion (i.e., rotation) through frictional forces imposed between the stationary lock-plates 106 and the movable lock-plates 104. In another exemplary embodiment, a locking adjustment function is provided in a second direction by coupling the motion of the steering column 108 in the second direction to the forced translation of the movable lock-plates 104. Again, the movable lock-plates 104 are positioned for frictional contact with the stationary lock-plates 106, which are configured and positioned so as to resist that relative motion (i.e., translation) through the imposition of frictional forces between the movable lock-plates 104 and the stationary lock-plates 106.

For convenience, this disclosure concentrates on a number of embodiments where relative motion between adjacent lock-plates 104, 106 is selectively opposed by imposition of frictional forces between adjacent plates. It is to be appreciated, however, that other mechanisms do exist for selectively imposing (and modulating) forces between adjacent plates, and that those alternative mechanisms are contemplated by this disclosure. For example, such forces may be imposed and modulated through manipulation of electro-magnetic mechanisms, use of fluids with controllable viscosities, variable geometries, or other means available in the art.

In an exemplary embodiment, the first direction may correspond to the telescoping adjustment of a steering column 108, i.e., adjustments made substantially parallel to a longitudinal axis 114 defined by the steering column 108, that may be substantially perpendicular to a plane defined by the steering wheel (not shown). In an exemplary embodiment, the second direction may correspond to the raking adjustment of a steering column 108, i.e., adjustments made substantially perpendicular to the longitudinal axis 114 of the steering column 108, which may be substantially parallel to the plane defined by the steering wheel (not shown). For convenience, this disclosure presents a number of embodiments wherein raking adjustment of the steering column 108 is coupled to the forced translation of the movable lock-plates 104 and wherein telescoping adjustment of the steering column 108 is coupled to the forced rotation of the movable lock-plates 104. It should be appreciated, however, that this disclosure also contemplates the coupling of raking adjustment of the steering column 108 to the forced rotation of the movable lock-plates 104 and the coupling of telescoping adjustment of the steering column 108 to the forced translation of the movable lock-plates 104.

Figure 2:
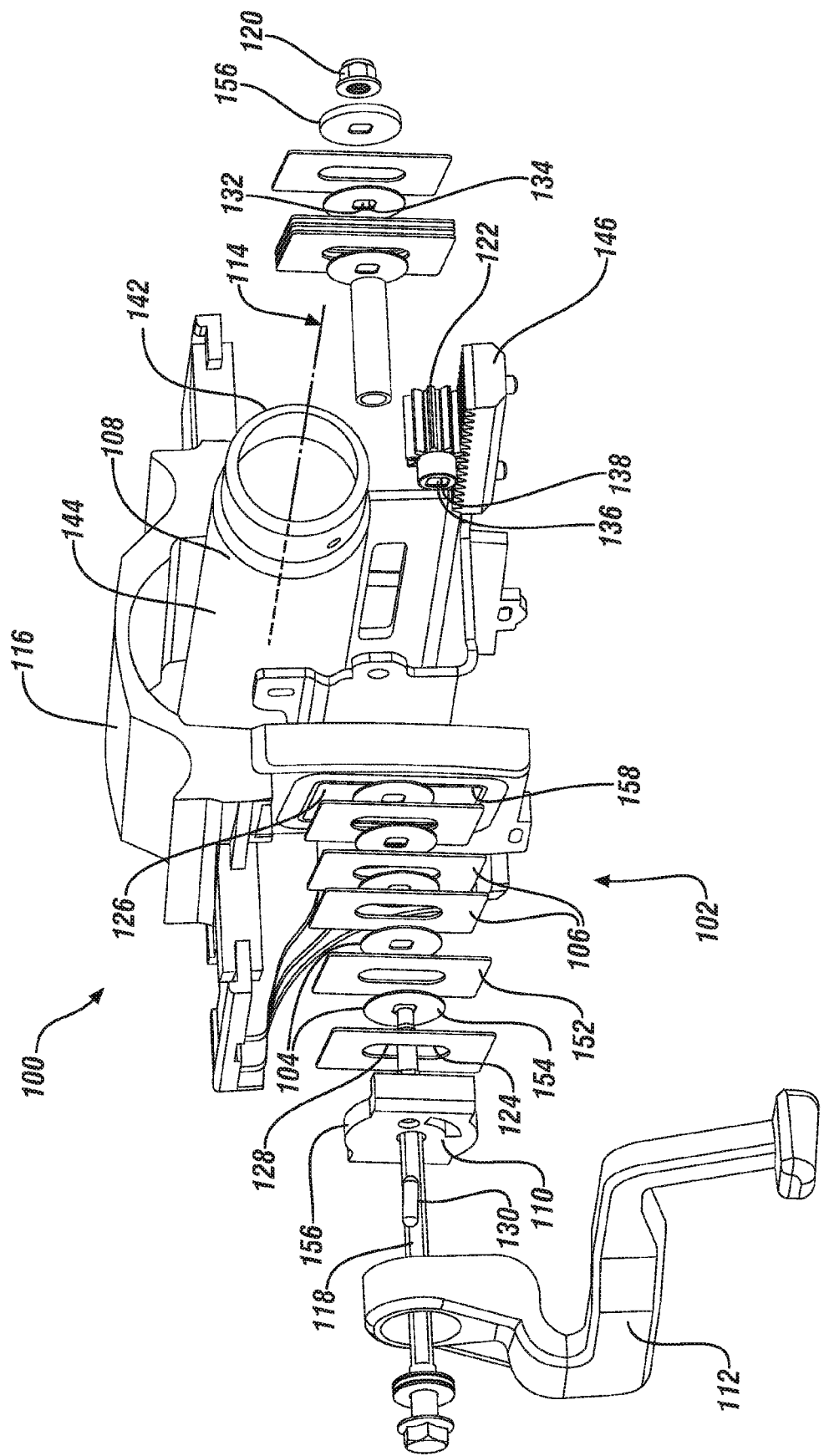
FIG. 2 is a drawing showing an exploded perspective view of an exemplary adjustable steering column.

As shown in FIG. 1 and FIG. 2, in an exemplary embodiment, an adjustable steering column assembly 100 comprises a stationary bracket 116 disposed about the steering column 108. The stationary bracket 116 accommodates telescoping adjustments to the steering column 108 along its longitudinal axis 114, such as toward or away from an operator of the steering column 108. The stationary bracket 116 also accommodates raking adjustments to the steering column 108 substantially perpendicular to its longitudinal axis 114. A control shaft 118 and retainer 120 retain one or more stationary lock-plates 106 and one or more movable lock-plates 104 to the stationary bracket 116. The control shaft 118 is oriented transversely to the longitudinal axis 114 and positioned so as to pass through the one or more stationary lock-plates 106, the one or more movable lock-plates 104, stationary bracket 116, and a gear 122. Each of the one or more stationary lock-plates 106 and each of the one or more movable lock-plates 104 are positioned alternately on the control shaft 118 so that each of the one or more stationary lock-plates 106 is positioned adjacent to at least one of the one or more movable lock-plates 104 and so that each of the one or more movable lock-plates 104 is positioned adjacent to at least one of the one or more stationary lock-plates 106.

Figure 3:
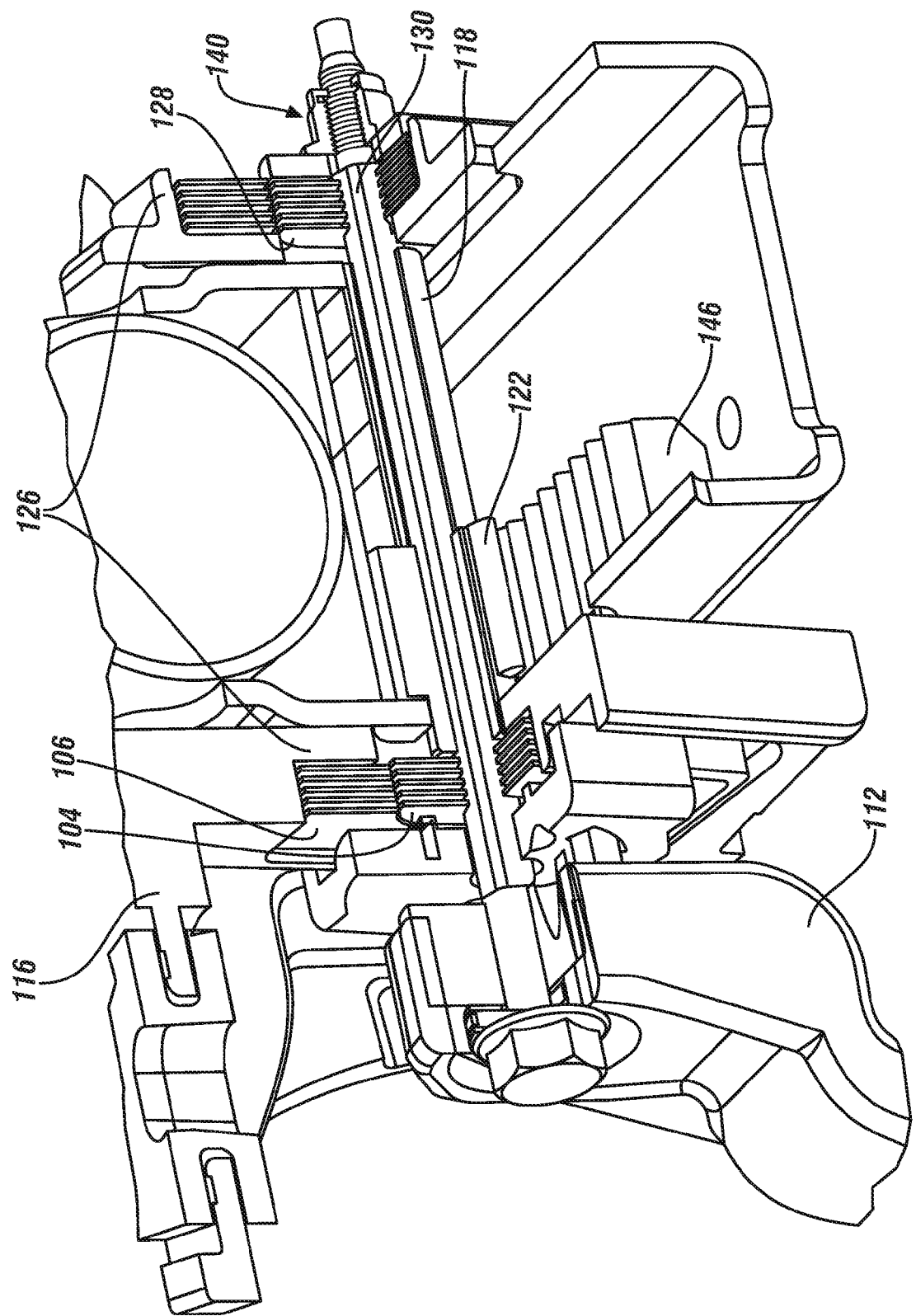
FIG. 3 is a drawing of an exemplary system for fixing a position of a steering column.

As shown in FIG. 2 and FIG. 3, the one or more stationary lock-plates 106 and the one or more movable lock-plates 104 are positioned adjacent to one another in parallel orientation for relative movement with control shaft 118. Each of the one or more stationary lock-plates 106 defines a clearance hole 124 in approximately its center for facilitating free rotation and translation of control shaft 118 within the clearance hole 124.

In general, as shown in FIG. 1, FIG. 2, and FIG. 3, the stationary bracket 116 is configured to accommodate translation of steering column 108 in a generally vertical direction (i.e., tilting or raking), approximately transversely to a longitudinal axis 114 defined by the steering column 108. Control shaft 118 is coupled to the steering column 108 in a substantially horizontal orientation, substantially perpendicular to the longitudinal axis 114, such that, as steering column 108 translates in a raking direction, control shaft 118 also translates with steering column 108. In addition, the control shaft 118 is coupled to the steering column 108 such that when raking translation of control shaft 118 is impeded, raking translation of steering column 108 is also impeded.

In an exemplary embodiment, the stationary bracket 116, which is fixed to the automobile, defines a lock channel 126 that houses the one or more stationary lock-plates 106 in a substantially fixed, stationary position. When the one or more stationary lock-plates 106 are assembled and positioned into the lock channel 126, they define a lock slot 128 that is oriented along the direction of travel of the control shaft 118 as the control shaft 118 translates with the raking of steering column 108 (i.e., substantially perpendicular to the central axis of the control shaft 118). Control shaft 118 passes through the lock slot 128 and is constrained by lock slot 128 to translate along the lock slot 128. As the control shaft 118 translates along the lock slot 128, transversely to the central axis of control shaft 118, the one or more movable lock-plates 104 also translate along the lock slot 128 together with the control shaft 118.

Figure 4:
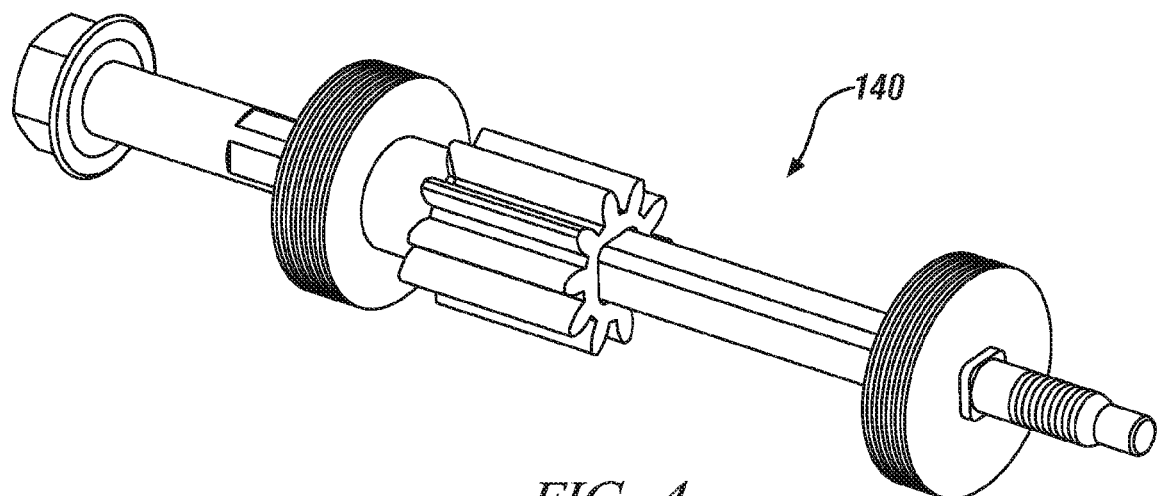
FIG. 4 is a drawing showing a perspective view of a portion of an exemplary system for fixing a position of a steering column.

As shown in FIG. 4, in an exemplary, non-limiting embodiment, a cross-section of the control shaft 118 defines a non-circular shaft shape 130. The one or more movable lock-plates 104 define an interior hole 132 with a lock-plate interior profile 134 that is complementary to the non-circular shaft shape 130 of the control shaft 118. Similarly, the gear 122 defines an interior hole 136 with a gear interior profile 138 that is also complementary to the non-circular shaft shape 130 of the control shaft 118. In an exemplary embodiment the non-circular shaft shape 130, the lock-plate interior profile 134, and the gear interior profile 138 each define one or more flat surfaces and/or edges so as to resist relative rotation. As one skilled in the art will appreciate, one or more set screws or tabs and grooves and/or splines could be arranged among the rotating group so as to resist relative motion. Thus, the non-circular shaft shape 130, the lock-plate interior profile 134, and the gear interior profile 138 interfere with relative rotation of one another. Accordingly, when the control shaft 118 passes through the respective non-circular holes 132, 136, the control shaft 118 and the one or more movable lock-plates 104, and the gear 122 are all constrained to rotate (or remain in a stationary, fixed position) together as a unitary group 140.

As shown in FIG. 1 and FIG. 2, steering column 108 comprises a first column shaft 142 and a second column shaft 144, which move relative to one another along the longitudinal axis 114 so as to facilitate telescoping adjustment of the steering column 108. In the illustrated embodiments, the first column shaft 142 and the second column shaft 144 are configured as co-axial cylinders; however other configurations are possible. In an exemplary embodiment, a telescoping motion actuator 146 is coupled to one of the first column shaft 142 and the second column shaft 144 so as to be constrained to move along the longitudinal axis 114, relatively to stationary bracket 116 and control shaft 118, as the steering column 108 undergoes telescoping motion. At the same time, however, the telescoping motion actuator 146 is positioned so as to be in cooperative contact with the gear 122 and is also coupled to one of the first column shaft 142 and the second column shaft 144 such that the telescoping motion actuator 146 undergoes raking movement together with the steering column 108. Thus, the telescoping motion actuator 146 remains in cooperative contact with the gear 122 throughout the range of telescoping and raking movement of the steering column 108.

The telescoping motion actuator 146 is configured and positioned so as to interact with the gear 122 and to thereby cause the unitary group 140 to rotate as the steering column extends or contracts along the longitudinal axis 114 (i.e., as the steering column 108 telescopes). Similarly, in situations where relative motion between the one or more movable lock-plates 104 and the one or more stationary lock-plates 106 is resisted (e.g., by friction and compressive force between the plates 104, 106), then telescoping motion of the steering column 108 will also be resisted through interaction between the gear 122 and the telescoping motion actuator 146. As described above, relative motion between the one or more stationary lock-plates 106 and the one or more movable lock-plates 104 can be resisted by friction. Thus, the system may be locked so as to prevent telescoping motion by employing the cam 110 or another mechanism so as to increase the tension in the control shaft 118 and consequently the compressive force and friction between the one or more stationary lock-plates 106 and the one or more movable lock-plates 104. As one skilled in the art will appreciate, automated mechanisms may be implemented so as to automatically lock the position of the steering column 108 (e.g., by causing an increase in compressive force) or automatically release the steering column 108 (e.g., by causing a decrease in compressive force) when desirable or advantageous.

Figure 5:
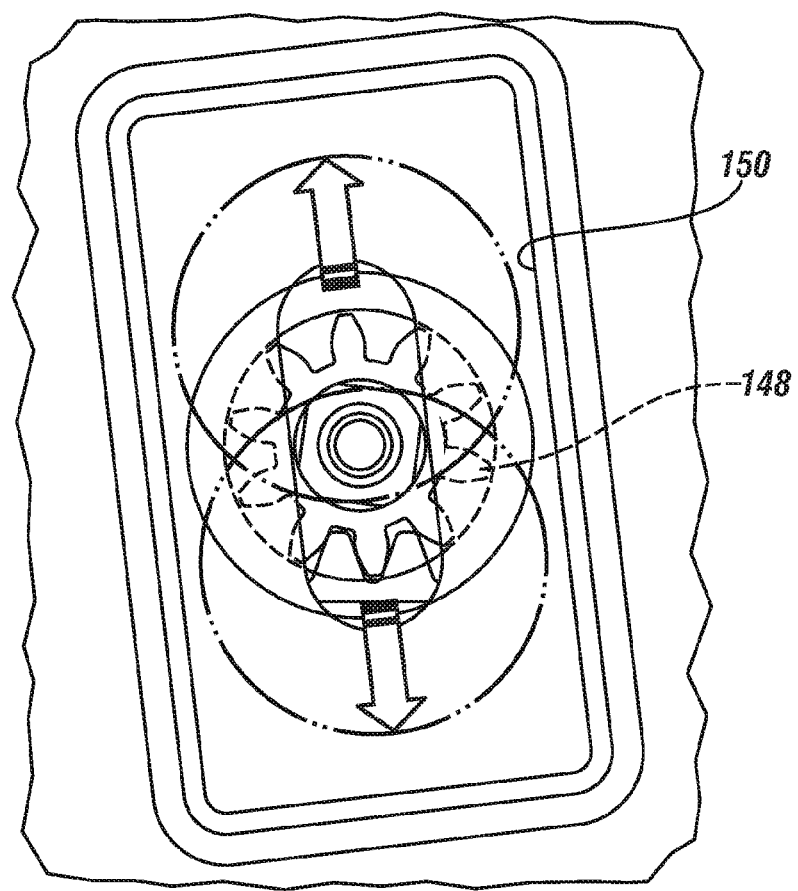
FIG. 5 is a drawing showing an exemplary system for fixing a position of a steering column while facilitating adjustments in a raking direction.
Figure 6:
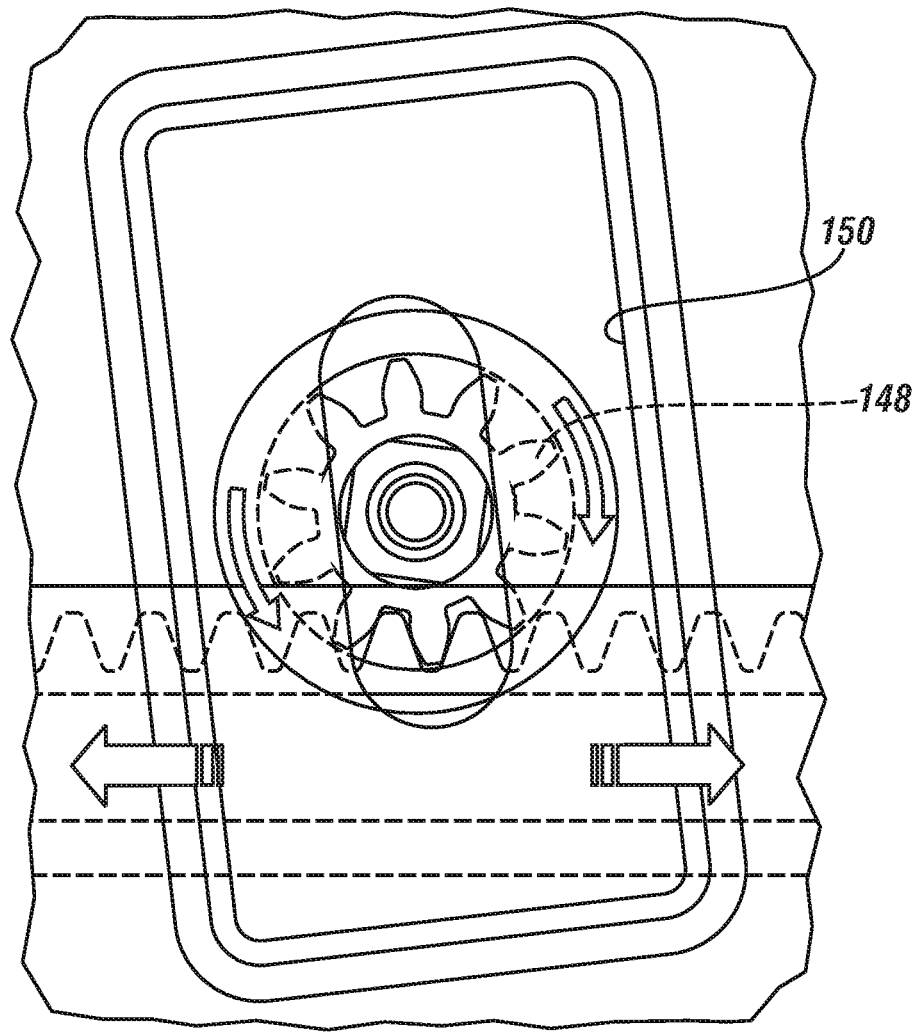
FIG. 6 is a drawing showing an exemplary system for fixing a position of a steering column while facilitating adjustments in a telescoping direction.

In another non-limiting exemplary embodiment, as can best be seen in FIG. 5 and FIG. 6, each of the one or more movable lock-plates 104 may define one or more lock teeth 148 around its outer periphery. The lock teeth 148 are configured for engaging and cooperating with a corresponding one or more elongated, stationary, grooves formed in a side 150 of the lock channel 126 and oriented substantially parallel to control shaft 118. The grooves are configured to cause the one or more movable lock-plates 104 to rotate as the steering column 108 is adjusted. In such an exemplary embodiment, as the control shaft 118 translates with the raking of steering column 108, the engagement of, and cooperation between, the telescope-lock teeth 148 and the grooves in side 150 would cause the one or more movable lock-plates 104 to rotate about control shaft 118. Thus, as the control shaft 118 translates (e.g., with the raking of steering column 108), the engagement of, and cooperation between, the telescope-lock teeth 148 and the grooves in side 150 would cause the movable lock-plates 104 on control shaft 118 to rotate about control shaft 118. Similar to other embodiments disclosed herein, the relative rotation between plates 106, 106 and the coupling of that relative motion to telescoping or raking adjustment of the steering column 108 facilitates selective control over the facilitation or prevention of those adjustments.

In each of the described embodiments, while the one or more movable lock-plates 104 are constrained to operate as a group, rotating with adjustment of the steering column 108 in a first direction and translating with adjustment of the steering column 108 in a second direction, the one or more stationary lock-plates 106 are also constrained to operate as a group, remaining stationary relative to the stationary bracket 116.

The stationary lock-plates 106 and the movable lock-plates 104 occupy alternating positions along control shaft 118 such that each of the stationary lock-plates 106 is adjacent to one or more of the movable lock-plates 104, and such that each of the movable lock-plates 104 is adjacent to one or more of the stationary lock-plates 106. Therefore, since the stationary lock-plates 106 remain stationary while the movable lock-plates 104 are constrained to rotate or translate with telescoping or raking movement of the steering column 108, adjacent plates are constrained to move (i.e., translate or rotate) relatively to one another with raking or telescoping translation of the steering column 108.

In an exemplary embodiment, friction between adjacent plates 104, 106 is employed to provide resistance to such relative movement. Thus, in accordance with this embodiment, each of the stationary lock-plates 106 has at least one surface 152 that, when pressed against an adjacent movable lock-plate 104, tends to impede relative movement of the adjacent movable lock-plate 104. Similarly, each of the movable lock-plates 104 may have at least one surface 154 that, when pressed against an adjacent stationary lock-plate 106, tends to impede relative movement between the adjacent plates 104, 106.

Control shaft 118 is configured for attachment to a retainer 120, such as a threaded nut, which is useful for applying a compressive force between the stationary lock-plates 106 and the movable lock-plates 104, by compressing the stack of alternating plates 104, 106 between a spacer 156 and a wall 158 of lock channel 126. In an exemplary embodiment, the retainer 120 is positioned so that the above-described compression force is applied as a result of the application of a tension force to control shaft 118. In another exemplary embodiment, the retainer 120 is positioned so that the above-described compression force is applied as a result of the application of a compression force to control shaft 118.

In an exemplary non-limiting embodiment, the retainer 120 and control shaft 118 are arranged and configured so as to create a compressive load on the one or more stationary lock-plates 106 and the one or more movable lock-plates 104 such that as the one or more stationary lock-plates 106 move relatively to the one or more movable lock-plates 104, friction is created between the one or more stationary lock-plates 106 and the one or more movable lock-plates 104. This friction produces resistance to telescoping and/or raking adjustment of the steering column 108. The tension in the control shaft 118, and thus the compressive force applied by the control shaft to the one or more stationary lock-plates 106 and the one or more movable lock-plates 104, may be adjusted by tightening or loosening the retainer 120 and or by actuating the cam 110. In an exemplary embodiment, cam 110 is positioned and configured so that when an operator rotates a handle attached to the cam 110, the position of the cam 110 changes so that the tension in the control shaft 118 also changes. One or more spacer 156 may be assembled to the control shaft 118 to provide positioning of the control shaft 118, and one or more springs may be positioned so as to establish and/or maintain the compressive force between the one or more stationary lock-plates 106 and the one or more movable lock-plates 104.

In an exemplary embodiment, the frictional forces and moments imposed by the stationary lock-plates 106 on the movable lock-plates 104, and by the movable lock-plates 104 on the stationary lock-plates 106, are directly related to the force applied to control shaft 118. As a result, variations in force applied to control shaft 118 are effective to cause variations in resistance to raking movement of the steering column 108. Accordingly, by controlling the tension (or compression, in certain arrangements) in control shaft 118 (for example, by selectively applying and releasing tension in control shaft 118), raking movement of the steering column 108 can be selectively impeded (i.e., selectively facilitated, resisted, and/or prevented).

As one skilled in the art will appreciate, the plates may be constructed of any dimensionally stable material such as ceramic or metal. Materials resistant to corrosion such as stainless steel or galvanized metal may be employed to prevent corrosive bonding between the plates. In addition, plates 104 and 106 may be positioned on only a right side of the steering column 108, on only a left of the steering column 108, or on both sides of the steering column 108 so as to meet design considerations associated with a particular implementation.

Thus, in an exemplary embodiment, a plurality of plates are stacked for rotation on a shaft and engaged to a stationary bracket. The plates are caused by a gear profile or other synchronizing feature to rotate relatively to one another as a steering column 108 is moved in a manner that is desired to be selectively limited, such as telescoping or raking motion of a steering column 108. Holding load performance is created by providing resistance to relative motion between adjacent plates. Variations in the number of plates and in the synchronizing feature profiles, in the plate materials, the compressive loads applied to the plates, the design of the plates, the surface finish of the plates and other features can be adjusted to achieve desired locking and motion resisting characteristics while accommodating a desired range of motion. Component deformation (e.g., spring loading) can also be used so as to provide desired friction characteristics as the steering column 108 is adjusted.

In an exemplary embodiment, the frictional forces resisting relative movement are sufficient to oppose typical operator-induced forces associated with operation of a motor vehicle, but are not so great as to resist movement of the steering column 108 in the event of an accident. As a result, a system and method for selectively fixing and adjusting a position of a steering column with improved reliability and compactness in size while also providing for an infinitely (i.e., continuously) variable range of raking and telescoping positions.

Thus, an infinitely (i.e., continuously) variable raking and telescoping motion are accommodated by the steering column while also providing for positional locking of the steering column at any of the raking/telescoping positions within the range of continuously variable positions of the steering column. In addition, the system also accommodates the provision of a resistive force as the raking and/or telescoping positioning of the steering column is adjusted. This resistive force can be adjusted by adjusting the tension in the control shaft and/or by disposition of a spring. Thus, the compressive force between the plates can be adjusted so as to provide a desired feel to an operator of the steering column.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column comprising a position lock for selectively resisting movement of the steering column, the steering column being configured and arranged for positional adjustments in a first direction and a second direction approximately perpendicular to the first direction, the position lock comprising:
   a stationary bracket fixed to a vehicle and disposed about the steering column, the stationary bracket defining a lock channel;
   a control shaft coupled to the steering column so as to couple movement of the steering column and translation of the control shaft, the control shaft being oriented approximately perpendicular to the first direction, the control shaft being oriented approximately perpendicular to the second direction;
   one or more stationary lock plates, each being retained in a substantially fixed position within the lock channel defined by the stationary bracket; and
   one or more movable lock plates, the movable lock plates being arranged on the control shaft for rotation about a central axis of the control shaft and for translation with the control shaft, each of the one or more movable lock-plates being positioned adjacent at least one stationary lock-plate;
   the lock channel configured to house the one or more stationary lock plates so as to prevent relative movement between the one or more stationary lock plates and the stationary bracket along the first direction and the second direction; and
   the one or more stationary lock-plates being configured so as to fit within the lock channel defined by the stationary bracket and to selectively provide resistance to relative movement of the one or more movable lock-plates;
   wherein the control shaft is disposed so as to pass through the lock channel and wherein the lock channel is disposed about a portion of the control shaft and along said portion of the control shaft.

2. The adjustable steering column of claim 1, wherein the first direction is oriented along a longitudinal axis defined by the steering column.

3. The adjustable steering column of claim 1, wherein the second direction is oriented in a substantially vertical plane.

4. The adjustable steering column of claim 1, wherein the resistance to relative movement of the one or more movable lock-plates is related to a compressive load applied between the one or more stationary lock-plates and the one or more movable lock-plates.

5. The adjustable steering column of claim 1, wherein the control shaft is engaged to a cam for selectively applying a compressive load between the one or more stationary lock-plates and the one or more movable lock-plates.

6. The adjustable steering column of claim 5, wherein the cam is biased toward a position associated with the application of compressive loads upon the one or more stationary lock-plates and the one or more movable lock-plates so as to tend toward locking the position of the steering column.

7. The adjustable steering column of claim 1, wherein motion of the steering column in the first direction is coupled to the forced rotation of the one or more movable lock-plates.

8. The adjustable steering column of claim 1, wherein motion of the steering column in the second direction is coupled to the forced rotation of the one or more movable lock-plates.

9. The adjustable steering column of claim 1, wherein motion of the steering column in the first direction is coupled to the forced translation of the one or more movable lock-plates.

10. The adjustable steering column of claim 1, wherein motion of the steering column in the second direction is coupled to the forced translation of the one or more movable lock-plates.

11. The adjustable steering column of claim 1, wherein the resistance to relative movement of the one or more movable lock-plates is related to friction between the one or more stationary lock-plates and the one or more movable lock-plates.

12. The adjustable steering column of claim 1, wherein the resistance to relative movement of the one or more movable lock-plates is related to a magnetic force imposed between the one or more stationary lock-plates and the one or more movable lock-plates.

13. The adjustable steering column of claim 1, wherein the resistance to relative movement of the one or more movable lock-plates is related to a viscous fluid force imposed between the one or more stationary lock-plates and the one or more movable lock-plates.

14. The adjustable steering column of claim 1, further comprising:
   a telescoping motion actuator coupled to a movable portion of the steering column; and
   a gear coupled to the control shaft and engaged to the telescoping motion actuator;

wherein the control shaft, the one or more movable lock-plates, and the gear are all constrained to rotate together as a unitary group; and wherein the telescoping motion actuator is configured and positioned so as to interact with the gear and to thereby cause the unitary group to rotate as the steering column moves in the first direction.

15. The adjustable steering column of claim 1, wherein a cross-section of the control shaft defines a non-circular shaft shape.

16. The adjustable steering column of claim 15, wherein at least one of the one or more movable lock-plates defines an interior hole with a lock-plate interior profile that is complementary to the non-circular shaft shape.

17. The adjustable steering column of claim 15, wherein the gear defines an interior hole with a gear interior profile that is complementary to the non-circular shaft shape.

18. The adjustable steering column of claim 15, wherein the non-circular shaft shape, the lock-plate interior profile, and the gear interior profile each define one or more flat surfaces.

19. The adjustable steering column of claim 1, wherein the stationary bracket accommodates adjustments to the steering column in the first direction.

20. The adjustable steering column of claim 1, wherein the stationary bracket accommodates adjustments to the steering column in the second direction.

* * * * *